United States Patent
Parts et al.

(10) Patent No.: US 8,290,438 B2
(45) Date of Patent: Oct. 16, 2012

(54) CONTROL OF RADIO PROCESS

(75) Inventors: Ülo Parts, Helsinki (FI); Sami Haapoja, Helsinki (FI); Seppo Kangasmaa, Helsinki (FI)

(73) Assignee: Nokia Corporation, Espoo (FI)

( * ) Notice: Subject to any disclaimer, the term of this patent is extended or adjusted under 35 U.S.C. 154(b) by 595 days.

(21) Appl. No.: 11/707,019

(22) Filed: Feb. 16, 2007

(65) Prior Publication Data

US 2007/0206631 A1    Sep. 6, 2007

(30) Foreign Application Priority Data

Nov. 3, 2006  (FI) ..................... 20065696

(51) Int. Cl.
*H04B 1/00*     (2006.01)
*H04B 15/00*   (2006.01)

(52) U.S. Cl. ..................................... 455/63.1

(58) Field of Classification Search ............... 455/63.1, 455/66.1, 67.11, 67.13, 41.2, 41.3, 552.1, 455/296, 556.1, 114.2, 115.1, 278.1, 197.1
See application file for complete search history.

(56) References Cited

U.S. PATENT DOCUMENTS

| | | | |
|---|---|---|---|
| 6,990,082 B1 | 1/2006 | Zehavi et al. | |
| 7,272,120 B2 * | 9/2007 | Rajkotia | 370/329 |
| 2003/0100308 A1 | 5/2003 | Rusch | |
| 2005/0068965 A1 | 3/2005 | Lin et al. | |
| 2006/0194538 A1 | 8/2006 | Palin et al. | |
| 2007/0281743 A1 | 12/2007 | Palin et al. | |
| 2008/0002623 A1 | 1/2008 | Piipponen et al. | |

OTHER PUBLICATIONS

International Search Report, PCT/FI2007/050590, filed Nov. 1, 2007.

* cited by examiner

*Primary Examiner* — Eugene Yun
(74) *Attorney, Agent, or Firm* — Squire Sanders (US) LLP

(57) ABSTRACT

An apparatus comprising a scheduler configured to schedule at least two radio communication processes for simultaneous operation, a controller configured to control a communication parameter of a radio communication process in the set of at least two radio communication processes, the controller being configured to control the communication parameter before the simultaneous operation of the at least two radio communication processes takes place.

19 Claims, 2 Drawing Sheets

CONTROL OF RADIO PROCESS

FIELD

Figure 1:
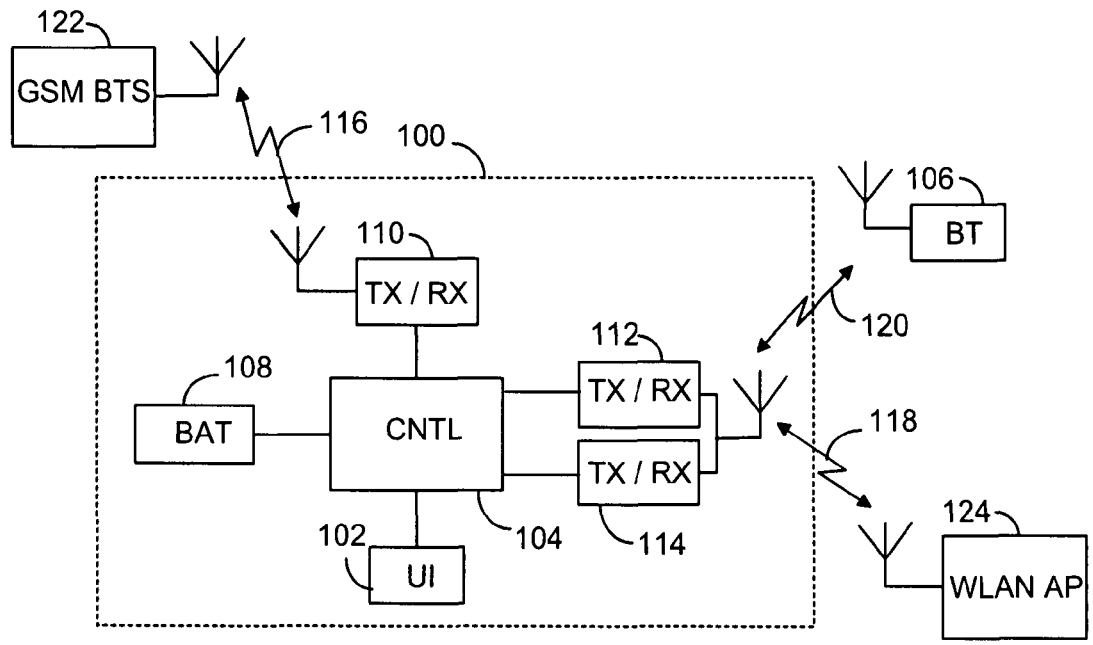

The invention relates to controlling of one or more radio communication processes.

BACKGROUND

The number of different radios in mobile communication devices is steadily increasing to facilitate more flexible connectivity and a broader range of services. Cellular access alone is no longer sufficient, but new wireless technologies are integrated into communication devices today and especially in the future to enable novel connectivity solutions. Integration of multiple radios into a single terminal, however, introduces a serious integration challenge that is becoming more pronounced as the number of radios increases. One element of the integration challenge is the appropriate handling of simultaneous operation of radios. It is quite evident that users are willing to use different radios at the same time, like using a headset employing wireless Bluetooth® technology during a GSM phone call, and using a wireless local area network (WLAN) connection for Internet surfing, for example.

If two or more operational radio connections are provided from one communication device, the connections may very well interfere with one another. Even if the connections are not operating on the same frequency band, they may still interfere with each other due to the non-idealities in the components of the communication device. The components may introduce spectral leakage, and the selectivity of receivers may not be ideal, meaning that they may also receive signal components belonging to a signal other than the desired one.

If a number of connections operate simultaneously on the same band, interference they cause to one another is much more severe than if they were operating on separate bands. These connections cause inter-system interference to one another, which may result in a degraded quality of service. This may happen because both connections operate from the same communication device, and thus the radio transceivers may be located within a few centimeters from each other. They may also be using the same radio components, like an antenna, for instance.

BRIEF DESCRIPTION

According to an aspect, there is provided an apparatus comprising a scheduler configured to schedule at least two radio communication processes for simultaneous operation, and a controller configured to control a communication parameter of a radio communication process in a set of the at least two radio communication processes, the controller being configured to control the communication parameter before the simultaneous operation of the at least two radio communication processes takes place.

In another aspect, there is provided an apparatus comprising means for scheduling at least two radio communication processes for simultaneous operation, and means for control controlling a communication parameter of a radio communication process in a set of the at least two radio communication processes, the controller being configured to control the communication parameter before the simultaneous operation of the at least two radio communication processes takes place.

In another aspect, there is provided a method, comprising scheduling at least two radio communication processes for simultaneous operation, and controlling a communication parameter of a radio communication process in a set of the at least two radio communication processes, the communication parameter being controlled before the simultaneous operation of the at least two radio communication processes takes place.

In another aspect, there is provided a computer program product encoding a computer program of instructions for executing a computer process, comprising scheduling at least two radio communication processes for simultaneous operation, and controlling a communication parameter of a radio communication process in a set of at the least two radio communication processes, the communication parameter being controlled before the simultaneous operation of the at least two radio communication processes takes place.

In another aspect, there is provided a computer program distribution medium readable by a computer and encoding a computer program of instructions for executing a computer process, comprising scheduling at least two radio communication processes for simultaneous operation, and controlling a communication parameter of a radio communication process in a set of the at least two radio communication processes, the communication parameter being controlled before the simultaneous operation of the at least two radio communication processes takes place.

DRAWINGS

Figure 2:
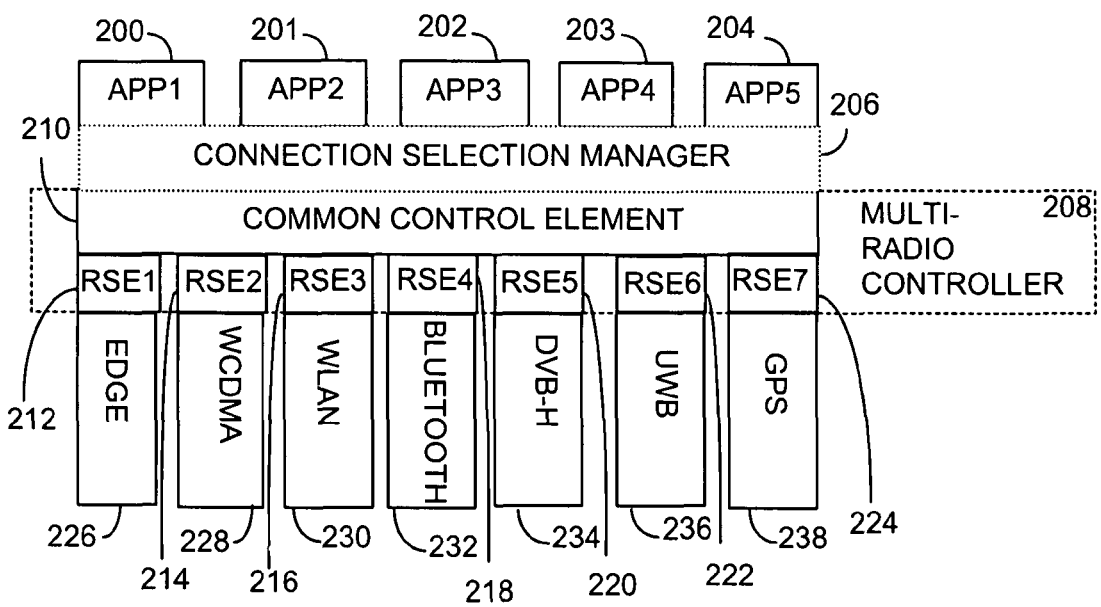
Figure 3:
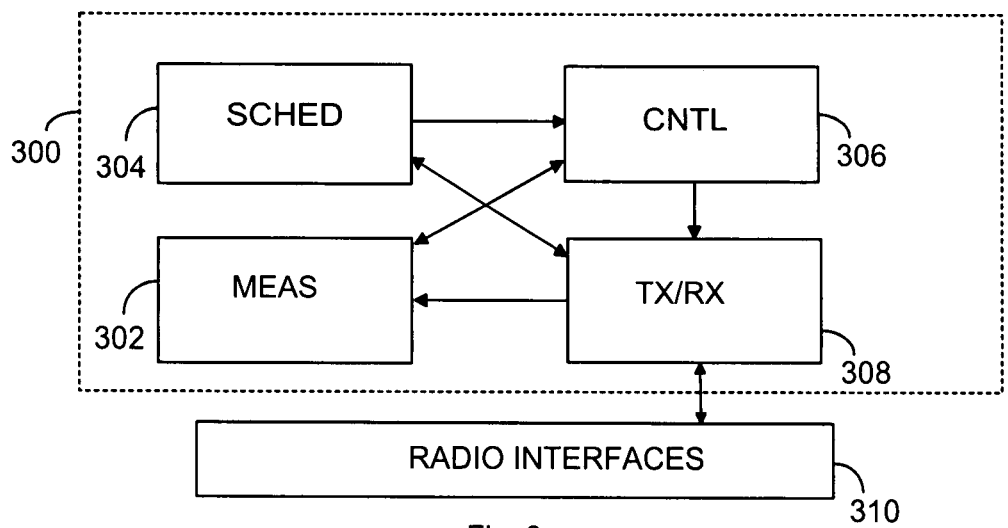
Figure 4:
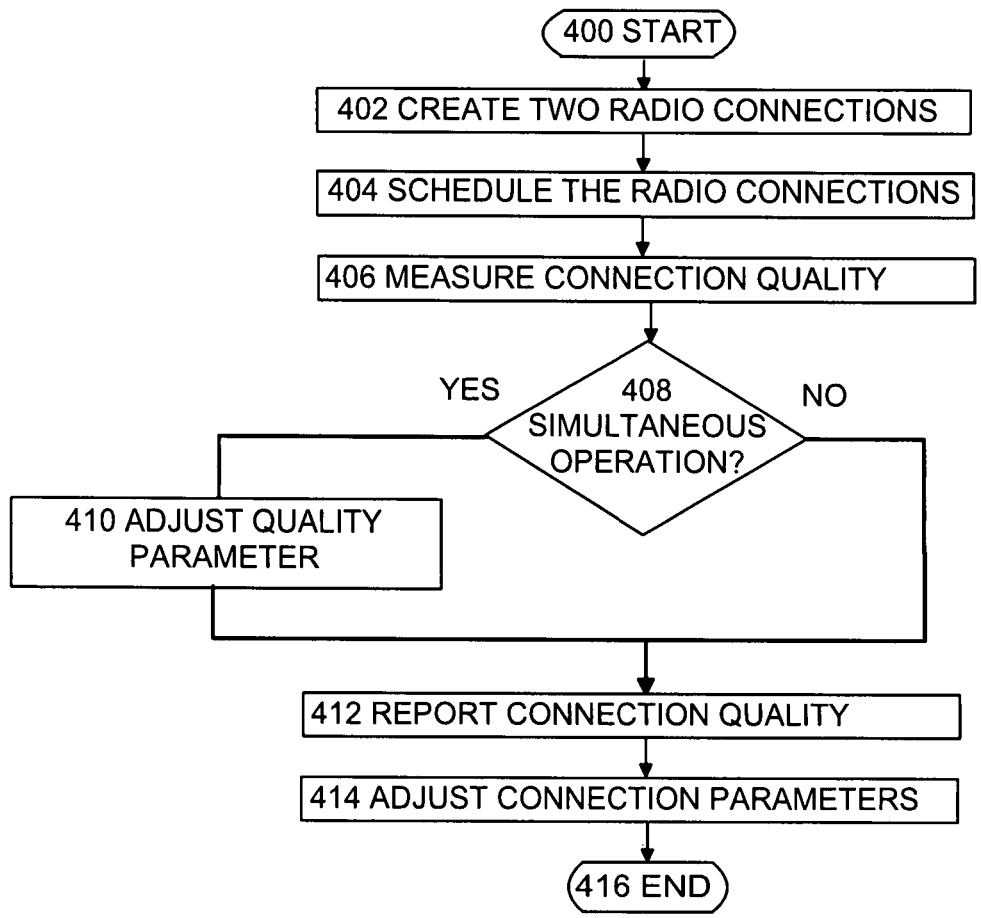

In the following, the invention will be described in greater detail with reference to the embodiments and the accompanying drawings, in which FIG. 1 shows a block diagram of a communication device employing a number of radio connections, FIG. 2 illustrates an example of architecture of a communication device, FIG. 3 illustrates an example of functionality of an apparatus, and FIG. 4 shows one embodiment of a method.

DESCRIPTION OF EMBODIMENTS

Next, a structure of a communication device employing a number of simultaneous radio connections will be described with reference to FIG. 1. The communication device 100 may be for example a mobile communication device, a computer, a laptop, or a PDA (Personal Digital Assistant). The communication device 100 may also be a combination of two electronic devices, such as a computer with a mobile communication device connected to the computer. An example of a combination of a PDA and a mobile communication device is the Nokia Communicator®.

The communication device 100 comprises a number of communication interfaces 110 to 114 to provide a wireless radio connection. The communication interfaces 110 to 114 may be configured to provide connections employing different radio access technologies. In our example, the communication interface 110 provides a communication link 116 with a GSM (Global System for Mobile Communications)-system through a serving GSM base transceiver station 122. The communication interface 114 provides a WLAN (Wireless Local Area Network) connection 118 with a serving WLAN access point 124. A communication interface 112 provides another wireless connection 120, using Bluetooth®-technology, with a device 106.

The communication interfaces 110 to 114 described above may be using partially the same components of the communication device 100 during the operation of radio connections 116 to 120. The communication interfaces 110 to 114 may be using for example the same antenna or antennas, radio frequency amplifier, and/or radio frequency filter. Each communication interface 110 to 114 may naturally have its own components or only some of the communication interfaces 110 to 114 may be using the same components.

In the example of FIG. 1, three communication interfaces 110 to 114 are provided in the communication device, these interfaces 110 to 114 providing the Bluetooth® connection 120, the GSM connection 116, and the WLAN connection 118, respectively. It should, however, be appreciated that the communication device according to the invention is limited neither to the number of communication interfaces in the communication device nor to the wireless communication technology the communication interfaces provide. Thus, the communication device may comprise several communication interfaces providing connections based on, for example, the following technologies: GSM, WLAN, WIMAX, Bluetooth®, WCDMA (Wideband Code Division Multiple Access), GPRS (General Packet Radio Service), EDGE (Enhanced Data Rates for GSM Evolution), DVB-H (Digital Video Broadcasting for Handheld devices), UWB (Ultra Wideband), GPS (Global Positioning System), CDMA2000, and 3G Long Term Evolution. Other wireless communication technologies are also possible to be implemented in the communication device according to the invention.

The communication device 100 further comprises a control unit 104 to control functions of the device 100. The control unit 104 comprises means for creating radio connections between the communication device 100 and other communication devices or networks. The control unit 104 also comprises means for controlling a number of simultaneous radio connections in the communication device 100. The control unit 104 may be implemented with a digital signal processor with suitable software or with separate logic circuits, for example with ASIC (Application Specific Integrated Circuit). The control unit 104 may also be a combination of these two implementations, such as a processor with suitable software embedded within an ASIC.

The communication device 100 further comprises a user interface 102 connected to the controlling unit. The user interface 102 may comprise a keyboard, a microphone, a loudspeaker, a display, and/or a camera.

The communication device 100 usually comprises a voltage source 108 to provide current for the operation of the device 100. The voltage source may be for example a rechargeable battery.

FIG. 2 illustrates an example of architecture of a communication device. The architecture is depicted in a layered form, like an OSI (Open Systems Interconnection) model of ISO (International Organization for Standardization), with lower layers providing services to higher layers.

On the highest layer are provided applications 200 to 204 that may need a radio connection. The application 200 to 204 may be for example an application handling a voice call, a web or WAP (Wireless Application Protocol) browser, an e-mail client, a GPS navigation application, a gaming application, or a media player application. The communication device may also comprise other applications. Whenever an application 200 to 204 needs a radio connection to another communication device or network, the application sends a request to a lower layer to establish the connection. During the operation of the connection, the application sends data related to the application to lower layers for transmission over the connection to the other communication device. Similarly, the application receives data related to the application from the other communication device via the connection through the lower layers. When a need no longer exists to maintain the connection, the application sends a request to a lower layer to terminate the connection.

On the lower layer, services may be provided to the applications 200 to 204 by a connection selection manager 206. The connection selection manager 206 may select an appropriate connection for an application based on a set of connection profiles stored in its database. A user or an operator, for example, may define the connection profiles, and the profiles may be based on optimization of some criterion, for example throughput, bit error rate or cost-efficiency of the connection. The connection selection manager 206 is an optional layer in the architecture of the communication device, since the applications 200 to 204 may be designed to define the suitable connections by themselves.

The next lower layer is a multiradio controller 208. The multiradio controller 208 establishes, controls, and terminates radio connections according to the connection requirements from the higher layers. The multiradio controller 208 is also responsible for taking care of the simultaneous operation of multiple radio connections.

The multiradio controller 208 may be a two-fold entity. First of all, there is a common control element 210, which communicates with the higher layers. It receives requests for creating and terminating a radio connection from the applications 200 to 204 or, if applied, the connection selection manager 206. The common control element 210 may also check the availability of the radio connection requested from a higher layer, and either start a process for creating a radio connection or inform higher layers that the requested radio connection is not currently available. The common control element 210 is also responsible for controlling the simultaneous operation of multiple radio connections by adjusting the parameters of an existing connection whenever a new radio connection which would interfere with an existing radio connection is created, or whenever the common control element 210 detects a sufficient change in the properties of an existing connection.

The multiradio controller 208 also comprises radio-specific entities 212 to 224. Each radio-specific entity can be seen as an interface between the common control element 210 of the multiradio controller 208 and the specific radio interface. A radio-specific entity takes care of controlling one radio connection according to the parameters received from the common control element 210. A radio-specific entity is close to the physical layer of the connection, which enables rapid adaptation to the changing environment and fast control of the connection. The functionality of each radio-specific entity is radio-system-specific, which means that the parameters from the common control element 210 are applied to the standard specifications of the radio system. A radio-specific entity may also supply the common control element 210 with the measured properties of the connection it controls. The measured properties of the connection may comprise the bit error rate (BER), block error rate, or the frame error rate (FER) of the connection. The measured properties may also comprise received energy per chip divided by the noise power density in the band (Ec/No), interference signal code power (ISCP), received signal code power (RSCP), received signal strength indicator (RSSI), signal-to-interference-power ratio (SIR).

In an embodiment of the multiradio controller, radio-specific entities are not included in the multiradio controller. Instead, the multiradio controller may have an interface to an external entity providing the interface to each radio.

Below the radio-specific entities 212 to 224 in FIG. 2, the communication interfaces 226 to 238 are provided. Each communication interface takes care of encoding and decoding data into suitable electrical waveforms for transmission and reception on the specific physical media used. This process is carried out according to each radio-access-specific standard. The architecture of FIG. 2 employs physical layers of EDGE, WCDMA, WLAN, Bluetooth®, DVB-H, UWB and GPS radio access technologies, but the operation of the multiradio controller is not limited to these technologies as it can be configured to control also other wireless radio access technologies.

FIG. 3 shows an embodiment of an apparatus 300. The apparatus may include or be a processor or a chipset, for instance. The chipset or integrated circuit may be suitable for use in a mobile phone or a portable computer, for instance. The shown functionalities may be implemented at the apparatus by software, by hardware or a combination of these. In the following, for simplicity, the apparatus refers to a mobile terminal.

FIG. 3 shows a radio interface 310 offering multiple radio interfaces for use by the mobile terminal. The terminal correspondingly includes a communication module 308 for co-operation with the radio protocols of the group of radio interfaces 310. Although FIG. 3 only shows the communication module 308 as one block, the functionalities of different radio systems may be separated to different functional units.

The apparatus further includes a measuring unit 302 for measuring the quality of a radio link of communication processes that are operational at the terminal. When estimating the quality of a radio link, the measuring unit provides a quality estimate of the downlink radio link of each communication process. The quality estimate may be provided as a bit-error-rate (BER), frame-error-rate (FER), signal-to-interference ratio (SIR) or any other known quality measure.

FIG. 3 further shows a controller 306 for controlling the apparatus. The controller may be configured to have a connection to the measuring unit 302 so as to receive a quality estimate of the radio link of a radio process. For signaling with a base station of a communication system, the terminal 300 may need to map the quality estimate to another value provided by the signaling protocol of the communication system in question. For instance, a BER measured by the measuring unit may have to be mapped to a channel quality indicator (CQI), or equivalent, for signaling purposes from the terminal to a base station. For mapping a BER to CQI, the control unit may have a look-up table or a calculation unit configured to calculate a CQI value from the BER. The CQI value may, for instance, get any value between 0 and 31, depending on the quality of the channel. CQI has here been referred to only as an example of a quality parameter, and the quality estimate of the radio link may be signaled in some other corresponding parameter used in the communication system.

The terminal 300 also includes a scheduler 304. The scheduler is configured to schedule the different radio systems operational at the terminal. That is, the scheduler controls the transmission/reception moments of different radio systems operated by the terminal. The scheduler may thus also be aware of situations where two potentially mutually interfering radio systems are scheduled to be operational simultaneously. In some embodiments, the scheduler may have a possibility to rearrange operation of the different systems such that an interference situation may be avoided. However, if rearrangements may not be carried out, other measures are needed.

In an embodiment, the control unit adjusts the value of the CQI (or equivalent) parameter when the control unit becomes aware that two potentially interfering systems are scheduled for simultaneous operation. The control unit may change the value of the CQI such that a value of the CQI parameter is indicated, which is worse than a value in normal operation of the terminal. We may consider an example wherein the CQI takes values from 0 to 31, where value 0 means an interference-free or best possible channel. We may assume that the channel measurement provides a SIR value, which is mapped to CQI value 10. Now, a fixed value 5 may be added to the CQI value, whereby CQI value 15 is to be signaled in uplink to the base station, whereby the terminal may indicate a value of the channel, which is worse than that which was originally measured.

As another example, one may consider a situation where a terminal has two radio processes operational at the same time, a WiMAX (Worldwide Interoperability for Microwave Access) radio process and a GSM process. At a certain moment, the terminal is scheduled to simultaneously receive in downlink via WiMAX and to transmit in uplink via GSM. The two radio systems are potentially interfering with each other in that the radio resources used by these two systems may be partially overlapping with each other. In this example, interference of the two systems may occur when WiMAX is receiving and GSM is transmitting.

In one embodiment, the terminal measures the channel quality of the WiMAX connection and obtains as usual, when there are no interfering systems, a channel quality estimate. The terminal may adjust the CQI parameter such that it indicates that the channel would have been worse than it actually was. The artificially worsened CQI value is then signaled to a WiMAX base station. The base station then may change one or more communication parameters of the WiMAX connection such that the downlink WiMAX transmission becomes stronger and suffers less from the interference of a simultaneously scheduled uplink GSM transmission.

FIG. 4 shows one embodiment of a method. The method of FIG. 4 may be partly employed in terminal equipment, and partly in a base station.

In 402, a multiradio device sets up two radio connections. The connections may be unidirectional or bidirectional. The connections may be to different radio systems or to same radio systems. The systems are, however, such that they may at least partly use same radio resources, such as a combination of frequency and time, for instance. Due to the partly overlapping use of resources, the systems may interfere with each other.

In 404, the radio connections or radio processes are scheduled. Scheduling refers here to allocation of radio resources for transmission. Scheduling may here also refer to knowledge of reception at a radio receiver. Thus, a scheduling process applied at the device is able to compare whether a known reception and known transmission from/to different systems are occurring simultaneously.

In 406, connection quality is measured. When the situation is considered from the point of view of the terminal, downlink connection quality can be measured. Uplink measurements may be performed in a base station of the radio system.

In 408, the terminal performs a check whether the radio processes operated by it are operating simultaneously. For instance, the terminal may have two processes, a web browser application running over an OFDM based System_A, and a voice call over System_B active and the third harmonic of System_B may lie on top of one active frequency resource block (a group of OFDM subcarriers) of System_A. If the terminal's scheduler knows that the reception over System_A and transmission over System_B are to occur simultaneously, the method branches to 410. In 410, the quality parameter measured in 406 is adjusted to indicate a worse channel quality in System_A than was the case in the actual reception.

Alternatively, the transmission in System_B is weakened by changing one or more parameters of the System_B transmission. Then, the System_B transmission causes less interference to System_A. In another embodiment, one or more parameters of both systems are changed to achieve the same goal. That is, the transmission in System_B is weakened and reception (downlink transmission) in System_A is made stronger.

In 412, a channel quality indicator is reported. In the example above, the report is sent to a base station operating System_A.

In 414, the base station may modify transmission parameters of the downlink connection of System_A such that the terminal is able to receive the transmission despite the interfering uplink transmission in System_B.

Possible modifications to the downlink transmission may include the packet length, the amount of data in a packet, the modulation scheme, the channel coding scheme, the transmission frequency/rate of packets, and/or format of the packet (preamble, header, payload, etc.).

The embodiment provides the significant advantage that the through-put of the network may be increased by decreasing the number of unsuccessfully received packets. Furthermore, the embodiment may be implemented by using standard protocols of radio systems for reporting channel quality, whereby no changes are required at the base station end.

In an embodiment, there is provided an apparatus comprising a scheduler configured to schedule at least two radio processes for simultaneous operation, a controller configured to control a communication parameter of a radio process in a set of at least two radio processes, the controller being configured to control the communication parameter before the simultaneous operation of the at least two radio processes takes place. The apparatus here may be a chipset, a processor, a module or a corresponding unit suitable for use in a mobile terminal, such as a mobile phone or a portable computer or some other device that includes radio functionality. The device including the apparatus may be a multiradio device, which is capable of operating in at least two radio systems simultaneously. The apparatus may control one or more communication parameters of one or more radio processes. The radio processes are such that the resources used by them are at least partly such that they may cause interference to each other.

In an embodiment, there is provided an apparatus wherein the at least two communication processes are between two communication parties. That is, the two communication processes may be between the same mobile terminal and the same base station. Alternatively, a multiradio having the two simultaneous processes may be in communication with two or more different base stations and/or user devices.

In one embodiment, there is provided an apparatus wherein the scheduler is configured to schedule reception in one communication process simultaneously to transmission in another communication process. That is, the scheduler knows the reception moments in one radio system it is using, and also knows the transmission moments in another system the apparatus is using. Based on this knowledge, the device may order a base station to strengthen its downlink transmission.

In an embodiment, there is provided an apparatus comprising a measuring unit configured to measure quality of a communication link of a communication process. In an embodiment, a mobile terminal measures the quality of a downlink channel in a radio system in which it is receiving downlink transmission.

In an embodiment, there is provided an apparatus wherein the quality of the measured connection is employed as a communication parameter of a communication process. The communication parameter may be a CQI indicator, for instance.

In an embodiment, there is provided an apparatus comprising a communication unit configured to communicate the quality to another party of a communication process. The parties of a communication process may be a mobile terminal and a base station, or a mobile station and another mobile station, for instance. The quality may be signaled to another party of the communication process in the form of a CQI parameter, for instance.

In an embodiment, there is provided an apparatus wherein the communication unit is configured to communicate a worse quality of the communication link than the measurement of the radio link indicates. This means that a mobile terminal may change the CQI indicator to a worse value before sending it to the base station. This way the terminal is able to receive in downlink stronger transmission than the terminal would otherwise receive on the basis of the measured channel quality. It is to be noted that the measured channel quality may be measured in a situation where no uplink transmission takes place in an interfering system. However, the mobile device notices that it will soon receive and transmit simultaneously in two interfering systems, wherefore it needs to change the communication parameters of at least one of the systems before the simultaneous operation is to occur.

The disclosed functionality in various embodiments may be implemented by way of a computer program product encoding a computer program of instructions for executing a computer process of the above-described method. The computer program product may be implemented on a computer program distribution medium. The computer program distribution medium may be any of the known ways of distributing software, such as a computer readable medium, a program storage medium, a record medium, a computer readable memory, a computer readable software distribution package, a computer readable signal, a computer readable telecommunication signal, and a computer readable compressed software package. Alternatively, some of the functionality may be implemented by hardware, such as ASIC (Application Specific Integrated Circuit) or by a combination of hardware and software.

Even though the invention has been described above with reference to an example according to the accompanying drawings, it is clear that the invention is not restricted thereto but it can be modified in several ways within the scope of the appended claims.

The invention claimed is:

1. An apparatus comprising:
a processor; and
a non-transitory memory including computer program code, the memory and the computer program code configured to, with the processor, cause the apparatus at least to
schedule at least two radio communication processes for simultaneous operation, and
control a communication parameter of a radio communication process in a set of the at least two radio communication processes, the apparatus being configured to control the communication parameter before the simultaneous operation of the at least two radio communication processes takes place based on expected interference between a new radio communication process of the at least two radio communication processes and an existing radio communication process of the at least two radio communication processes.

2. The apparatus of claim 1, wherein the at least two radio processes employ different radio systems.

3. The apparatus of claim 2, wherein the different radio systems employ at least partly overlapping radio resources.

4. The apparatus of claim 1, wherein the memory and the computer program code are further configured to, with the processor, cause the apparatus at least to schedule reception in one radio communication process simultaneously with transmission in another radio communication process.

5. The apparatus of claim 1, comprising:
a measuring unit configured to measure quality of a communication link of a communication process.

6. The apparatus of claim 5, wherein the quality of the measured connection is employed as a communication parameter of a radio communication process.

7. The apparatus of claim 5, comprising:
a communication unit configured to communicate the quality to another party of a radio communication process.

8. The apparatus of claim 7, wherein the communication unit is configured to communicate quality of the communication link that is worse than that indicated by the measurement of the radio link.

9. The apparatus of claim 1, wherein the apparatus is a multiradio mobile station.

10. An apparatus comprising:
scheduling means for scheduling at least two radio communication processes for simultaneous operation; and
controlling means for controlling a communication parameter of a radio communication process in a set of the at least two radio communication processes, the means for controlling controls the communication parameter before the simultaneous operation of the at least two radio communication processes takes place based on expected interference between a new radio communication process of the at least two radio communication processes and an existing radio communication process of the at least two radio communication processes.

11. A method comprising:
scheduling, by a device, at least two radio communication processes for simultaneous operation; and
controlling, by the device, a communication parameter of a radio communication process in a set of the at least two radio communication processes, the communication parameter being controlled before the simultaneous operation of the at least two radio communication processes takes place based on expected interference between a new radio communication process of the at least two radio communication processes and an existing radio communication process of the at least two radio communication processes.

12. The method of claim 11, further comprising:
configuring the two radio communication processes to employ different radio systems, which use at least partly overlapping radio resources.

13. The method of claim 11, wherein reception in one radio communication process is scheduled simultaneously with transmission in another radio communication process.

14. The method of claim 11, further comprising:
measuring quality of a communication link of a communication process.

15. The method of claim 14, further comprising:
communicating the quality of the measured connection to another party of a radio communication process.

16. The method of claim 15, further comprising:
communicating quality of the communication link that is worse than that indicated by the measurement of the radio link to the other party of the radio communication process.

17. A non-transitory computer-readable medium having computer-executable components, comprising:
scheduling at least two radio communication processes for simultaneous operation; and
controlling a communication parameter of a radio communication process in a set of at least two radio communication processes, the communication parameter being controlled before the simultaneous operation of the at least two radio communication processes takes place based on expected interference between a new radio communication process of the at least two radio communication processes and an existing radio communication process of the at least two radio communication processes.

18. A non-transitory computer-readable medium having stored thereon a data structure, comprising:
scheduling at least two radio communication processes for simultaneous operation; and
controlling a communication parameter of a radio communication process in a set of the at least two radio communication processes, the communication parameter being controlled before the simultaneous operation of the at least two radio communication processes takes place based on expected interference between a new radio communication process of the at least two radio communication processes and an existing radio communication process of the at least two radio communication processes.

19. The non-transitory computer-readable medium of claim 18, the computer-readable medium comprising one or more of a program storage medium, a record medium, a computer readable memory, a computer readable software distribution package, and a computer readable compressed software package.

* * * * *